Jan. 27, 1925. 1,524,599
H. TRZECIAK
COMBINED LAND AND WATER VEHICLE
Filed July 18, 1923 3 Sheets-Sheet 2

Jan. 27, 1925.  
H. TRZECIAK  
COMBINED LAND AND WATER VEHICLE  
Filed July 18, 1923   3 Sheets-Sheet 3

Inventor  
Herman Trzeciak.  
by J. K. Bryant  
Attorney

Patented Jan. 27, 1925.

1,524,599

UNITED STATES PATENT OFFICE.

HERMAN TRZECIAK, OF WAKPALA, SOUTH DAKOTA, ASSIGNOR OF ONE-HALF TO KAZIMIERZ BLASCYK, OF WAKPALA, SOUTH DAKOTA.

COMBINED LAND AND WATER VEHICLE.

Application filed July 18, 1923. Serial No. 652,368.

*To all whom it may concern:*

Be it known that I, HERMAN TRZECIAK, a citizen of Poland, residing at Wakpala, in the county of Corson and State of South Dakota, have invented certain new and useful Improvements in Combined Land and Water Vehicles, of which the following is a specification.

This invention relates to certain new and useful improvements in combined land and water vehicles, the vehicle when used upon land being in the form of a motor sleigh carrying front and rear runners with drive wheels for the sleigh mounted upon the rear runners and operated by the usual motor housed within the vehicle body.

A further object of the invention is to provide an improved type of drive wheel for a motor sleigh or water vehicle wherein resiliently mounted radial arms carry ground engaging spurs at their outer ends, each arm carrying a paddle blade adapted for use when the vehicle is used in water.

With the above and other objects in view as the nature of the invention is better understood, the same consists of the novel form, combination and arrangement of parts hereinafter more fully described, shown in the accompanying drawings and claimed.

Figure 1:
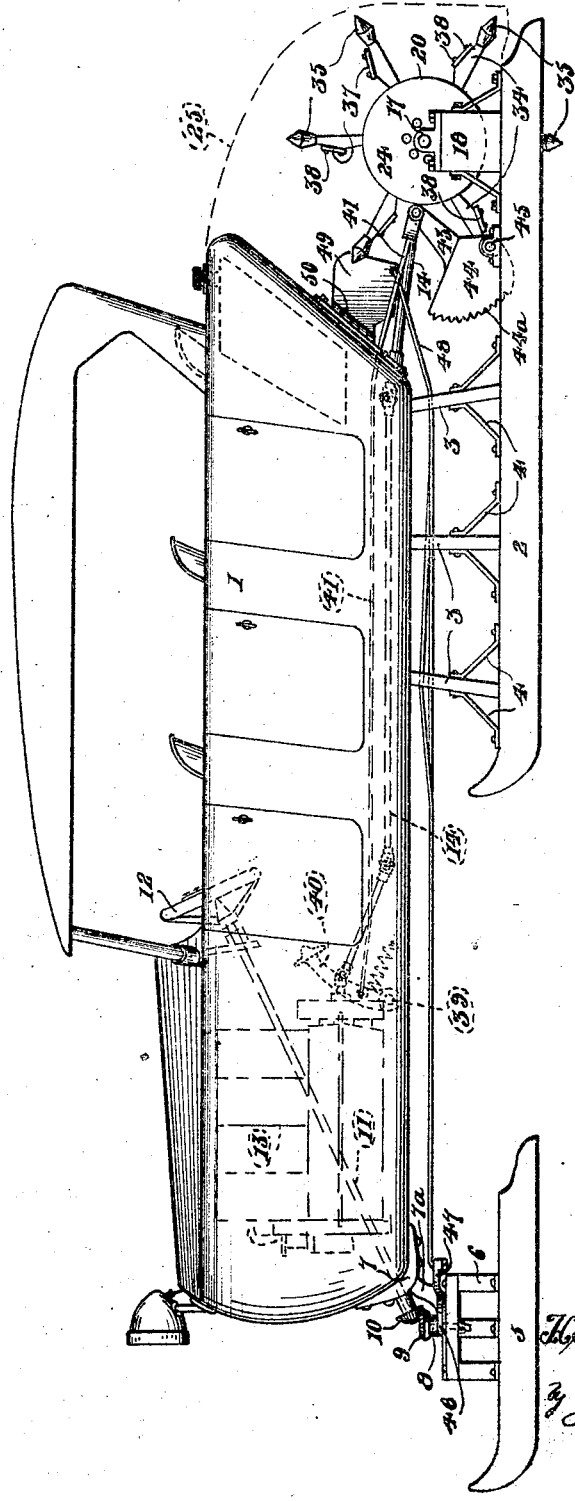
Figure 2:
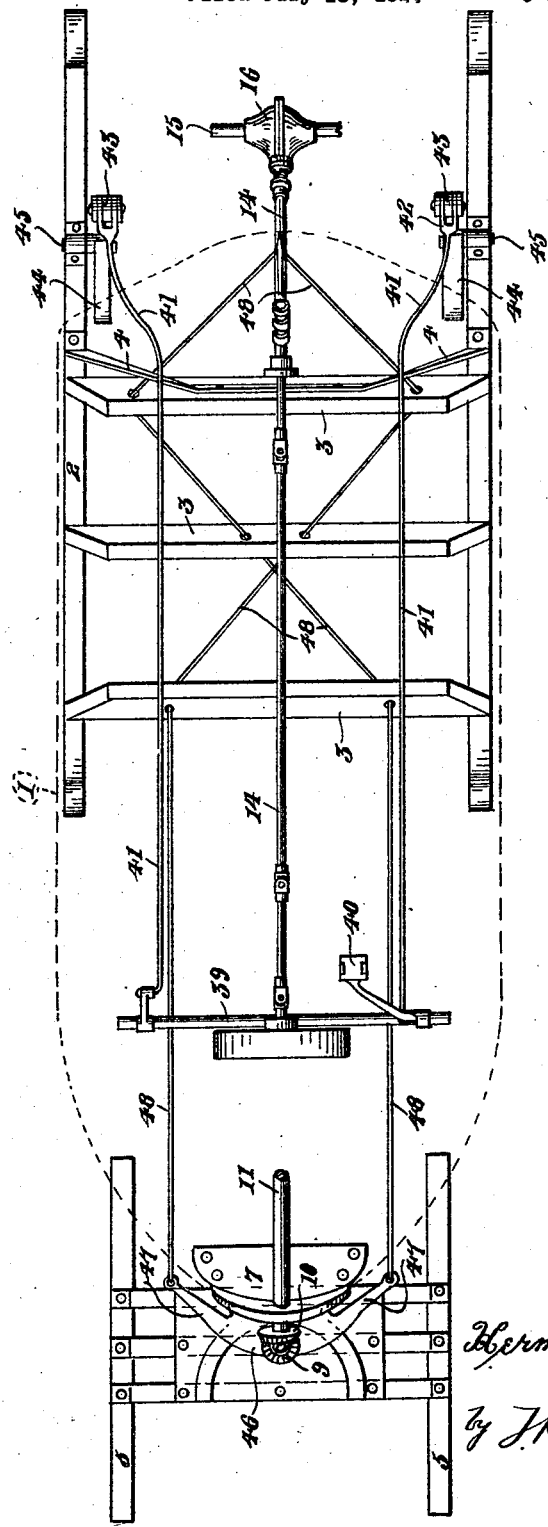
Figure 3:
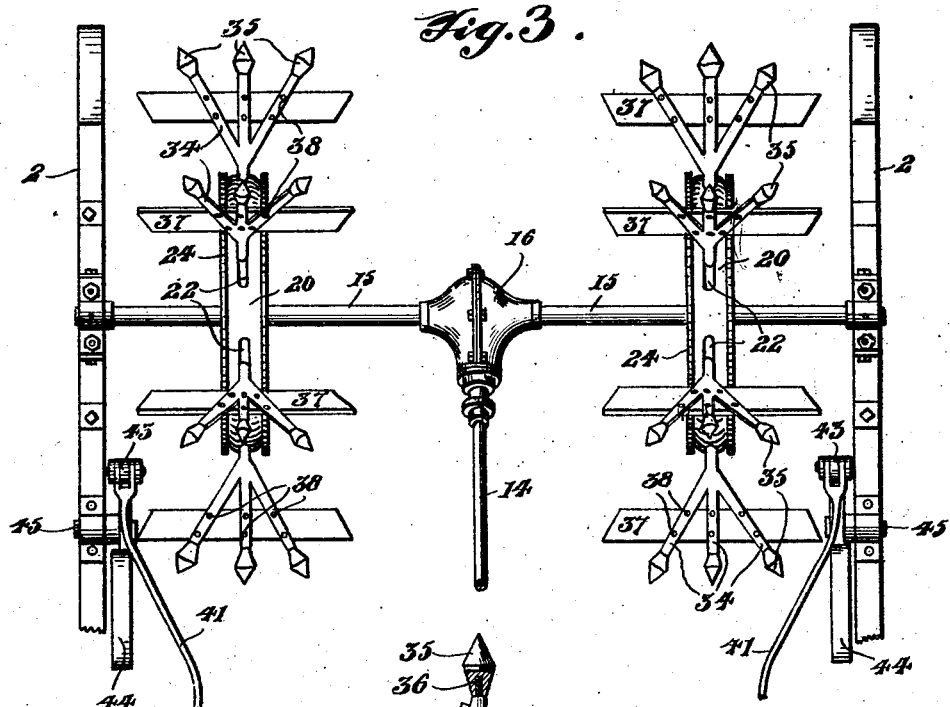
Figure 4:
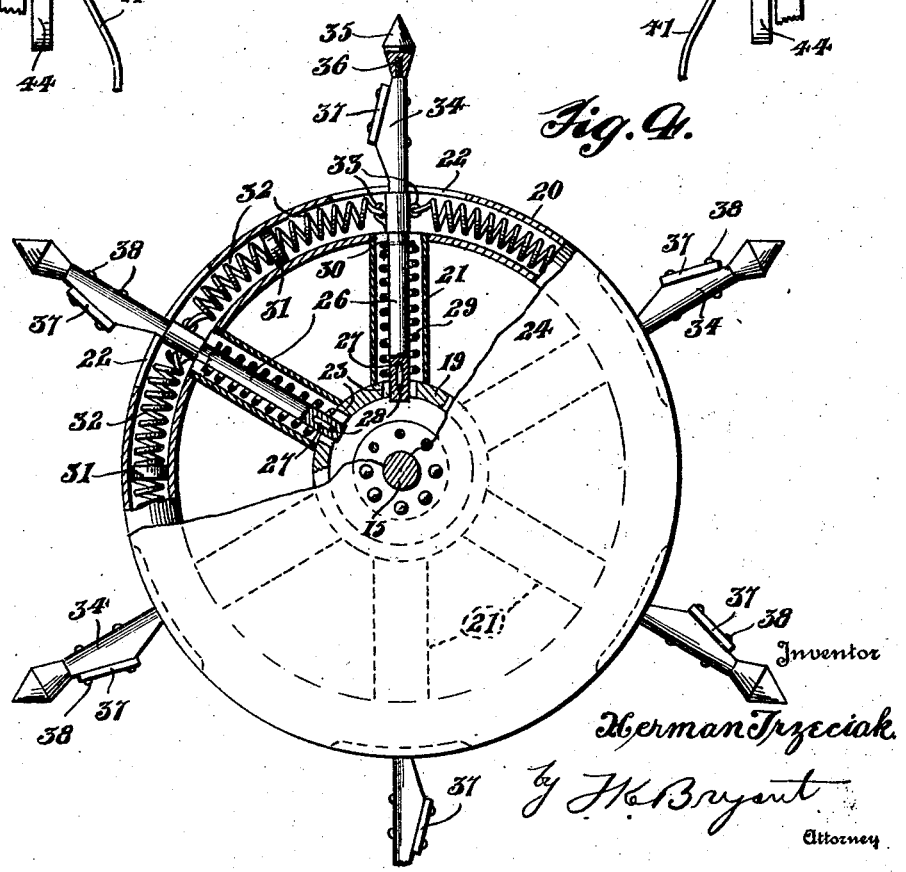

In the drawings, wherein like reference characters designate corresponding parts throughout the several views, Figure 1 is a side elevational view of a combined land and water vehicle constructed in accordance with the present invention, showing the propelling wheels at the rear end of the vehicle body, the braking for the land vehicle and the steering means for the water vehicle, Figure 2 is a top plan view of the chassis construction with the rear propeller or drive wheels removed and showing the brake and steering mechanisms, Figure 3 is a fragmentary top plan view of the rear end of the vehicle chassis showing the drive wheels for land and water, and Figure 4 is a side elevational view, partly shown in section of one of the drive wheels.

Referring more in detail to the accompanying drawings, there is illustrated a combined land and water vehicle comprising a vehicle body 1 in the form of an automobile body provided with watertight doors to permit the body to travel through water, the rear end of the body 1 being supported on sled runners 2 by transverse supporting bars 3 interposed between the body 1 and sled runners as illustrated in Figs. 1 and 2, the transverse bars 3 being placed by the angle members 4. The front end of the vehicle body is supported by forward sled runners 5 carrying a frame structure 6 and bracket support 7 interposed between the vehicle body and frame structure as clearly illustrated in Figs. 1 and 2.

The steering mechanism for the vehicle or motor sleigh includes a perpendicular shaft 8 extending upwardly from the frame structure 6 and fixed thereto, the upper end of the shaft 8 carrying a bevel gear 9 that is engaged by the bevel gear 10 upon the lower forward end of the steering post 11 having the usual steering wheel 12 as shown in Figs. 1 and 2. The bracket mounting 7 is fixed to the vehicle body 1 and the lower end 7ª thereof is pivotally supported upon the frame structure 6 axially of the shaft 8.

The driving mechanism for the vehicle when used as a motor sleigh, includes a motor 13, illustrated by dotted lines in Fig. 1 and housed within the vehicle body with a drive rod connection 14 with the rear axle 15 that carries the usual differential mechanism 16 as shown in Figs. 2 and 3. Each end of the axle 15 is supported in a bearing 17 mounted upon the upper end of a block 18 carried by the rear sled runners 2 and a driving wheel is supported adjacent each end of the axle 15 inwardly of the side runners 2.

The drive wheel construction is shown more clearly in Figs. 3 and 4 and includes a hollow hub 19 and an annular concentric tubular rim 20 maintained in rigidly spaced relation relative to the hub 19 by the tubular spokes 21, the spokes being fixed to the hub and tubular rim. An opening is provided in the inner side of the tubular rim 20 to accommodate the mounting of the outer ends of the tubular spokes 21 while circumferentially extending slotted openings 22 are provided in the outer side of the tubular rim, the hollow hub 19 being provided with slotted openings 23 communicating with the inner open end of the spokes. A disk plate 24 closes each side of the wheel structure as shown in Figs. 1 and 4, and a hood 25, illustrated by dotted lines in Fig. 1 overlies the drive wheel.

A rod 26 is resiliently mounted in each tubular spoke 21, the inner end thereof projecting inwardly of the opening 23 in the hub 19 while the outer end thereof projects through the circumferentially extending slot 22 in the outer side of the tubular rim 20. The inner end of each spoke rod 26 is longitudinally slotted as at 27, and a pin 28 extending transversely of the slotted openings 23 in the hub projects through the rod slot 27 providing a sliding and pivotal mounting for the inner end of the rod. A coil spring 29 surrounds the inner end of the rod 26 within the tubular spokes 21, the inner end of the spring engaging the outer face of the hub 19 within the spoke as illustrated in Fig. 4 while the outer end of the spring engages the cross pin 30 carried by the rod 26 for placing the rod under tension and normally holding the same at its limit of outward movement. As shown in Fig. 4, a disk abutment 31 is anchored in the tubular rim 20 intermediate adjacent tubular spokes 21, a coil spring 32 being positioned in the tubular rim at each side of the rod 26, engaging the abutment disks 31 and being anchored as at 33 to opposite sides of the rod permitting limited pivotal movement of the outer end of the rod in a circumferential direction.

The outer end of each spoke rod 26 carries a plurality of feet 34 with a ground engaging spur 35 detachably connected as at 36 to the outer end of each leg, the spurs 35 being removable for replacement when damaged. As shown more clearly in Fig. 3, a transversely extending plate or blade 37 is secured as at 38 to the feet 34, the spurs 35 functioning when the vehicle is used upon land while the blades 37 constitute water propellers when the vehicle is used as a boat.

Braking means is provided for the drive wheels when used as a land vehicle, a transverse brake rod 39 carrying a brake pedal 40 and having rod connections 41 with links 42 that are attached to the arms 43 carried by the brake shoes 44 that in turn are pivotally mounted as at 45 upon the rear runners 2, the working faces of the brake shoes 44 being serrated as at 44ª to insure braking engagement with the roadbed.

To accomplish steering of the device when used as a water vehicle, a plate 46 is secured to the frame structure 6 of the forward runner 5, the plate 46 carrying oppositely directed arms 47 to which cables 48 are attached, the cables crossing each other, as illustrated in Fig. 2, and passing through the transverse brace bars 3 to be guided thereby for attachment to the rudder 49 that is pivotally mounted as at 50 upon the rear end of the vehicle body 1, as shown more clearly in Figs. 1 and 2.

From the above detail description of the invention, it is believed that the construction and operation thereof will at once be apparent, it being noted that when the device is used as a land vehicle in the form of a motor sleigh, the ground engaging spurs 35 carried by the drive wheels cause a forward propulsion of the sleigh, the spoke rods 26 having limited longitudinally sliding movement as well as tensioned circumferential movement adjacent the outer ends thereof accommodated by the pin and slot connection for the inner ends of said rods. The brake shoes 44 are applied in the usual manner by the brake pedal 40 and link rod connections therewith controlling movement of the sled. Steering thereof is accomplished by the front runners 5 and the steering mechanism directly associated therewith and as shown more clearly in Fig. 1. When the device is used as a water vehicle or boat, cross plates or blades 37 function as propellers and steering thereof is accomplished by the rudder 49 connected to the arms 47 of the plate 46 that is operated by the usual steering mechanism, as above described.

While there is herein shown and described the preferred embodiments of the present invention, it is nevertheless to be understood that minor changes may be made therein without departing from the spirit and scope of the invention as claimed.

What is claimed as new is:—

1. A ground engaging and water propelling wheel for land and water vehicles embodying a hollow hub and tubular rim, tubular spokes connecting the hub and rim, spoke rods pivotally connected at their inner ends to the hubs and extending outwardly through the tubular spokes and rim and mounted for limited pivotal movement circumferentially of the rim and coil springs within the tubular rim engaging opposite sides of the spoke rods.

2. A ground engaging and water propelling wheel for land and water vehicles embodying a hollow hub and tubular rim, tubular spokes connecting the hub and rim, spoke rods pivotally connected at their inner ends to the hubs and extending outwardly through the tubular spokes and rim and mounted for limited pivotal movement circumferentially of the rim, coil springs within the tubular rim engaging opposite sides of the spoke rods, the pivotal mounting for the inner ends of the spokes including pin and slot connections and a coil spring surrounding each rod, engaging the hub at their inner ends, and abutments for the outer ends of the springs carried by the spoke rods.

3. A ground engaging and water propelling wheel for land and water vehicles embodying a hollow hub and tubular rim, tubular spokes connecting the hub and rim, spoke rods pivotally connected at their inner ends to the hubs and extending outwardly through the tubular spokes and rim and mounted for limited pivotal movement circumferentially of the rim, coil springs within the tubular rim engaging opposite sides of the spoke rods, a plurality of feet carried by the outer end of each rod, ground engaging spurs detachably connected to the feet and a transverse water blade fixed to set of feet.

4. A ground engaging and water propelling wheel for land and water vehicles embodying a hollow hub and tubular rim, tubular spokes connecting the hub and rim, spoke rods pivotally connected at their inner ends to the hubs and extending outwardly through the tubular spokes and rim and mounted for limited pivotal movement circumferentially of the rim, coil springs within the tubular rim engaging opposite sides of the spoke rods, the pivotal mounting for the inner ends of the spokes including pin and slot connections and a coil spring surrounding each rod, engaging the hub at their inner ends, abutments for the outer ends of the springs carried by the spoke rods, a plurality of feet carried by the outer end of each rod, ground engaging spurs detachably connected to the feet and a transverse water blade fixed to set of feet.

5. A ground engaging and water propelling wheel for land and water vehicles embodying a hub and a tubular rim, tubular spokes between the hub and rim and said rim having openings in the inner and outer sides thereof registering with the tubular spokes, spoke rods extending through the tubular spokes and projecting through the rim openings and spring devices in the tubular spokes and rim associated with the spoke rods.

6. A ground engaging and water propelling wheel for land and water vehicles embodying a hub and a tubular rim, tubular spokes between the hub and rim and said rim having openings in the inner and outer sides thereof registering with the tubular spokes, spoke rods extending through the tubular spokes and projecting through the rim openings and spring devices in the tubular spokes and rim associated with the spoke rods, the mounting for the spoke rods permitting limited axial movement thereof and pivotal movement at their inner ends.

7. A ground engaging and water propelling wheel for land and water vehicles embodying a hub and tubular rim, tubular spokes between the hub and rim and said rim having openings in the inner and outer sides thereof registering with the tubular spokes, spoke rods extending through the tubular spokes and projecting through the rim openings, a coil spring surrounding each spoke rod for normally forcing the same in an outward direction and coil springs in the tubular rim engaging opposite sides of the spoke rods.

8. A ground engaging and water propelling wheel for land and water vehicles embodying a hub and a tubular rim, tubular spokes between the hub and rim and said rim having openings in the inner and outer sides thereof registering with the tubular spokes, spoke rods extending through the tubular spokes and projecting through the rim openings, a coil spring surrounding each spoke rod for normally forcing the same in an outward direction and coil springs in the tubular rim engaging opposite sides of the spoke rods, the mounting of the spoke rods permitting limited axial movement thereof and pivotal movement at their inner ends.

9. A ground engaging and water propelling wheel for land and water vehicles embodying a hub and a tubular rim, tubular spokes between the hub and rim and said rim having openings in the inner and outer sides thereof registering with the tubular spokes, spoke rods extending through the tubular spokes and projecting through the rim openings and spring devices in the tubular spokes and rim associated with the spoke rods, the outer end of each spoke rod having a plurality of divergent feet and a transverse water blade secured to the feet.

10. A ground engaging and water propelling wheel for land and water vehicles embodying a hub and a tubular rim, tubular spokes between the hub and rim and said rim having openings in the inner and outer sides thereof registering with the tubular spokes, spoke rods extending through the tubular spokes and projecting through the rim openings and spring devices in the tubular spokes and rim associated with the spoke rods, the mounting for the spoke rods permitting limited axial movement thereof and pivotal movement at their inner ends, the outer end of each spoke rod having a plurality of divergent feet and a transverse water blade secured to the feet.

11. A ground engaging and water propelling wheel for land and water vehicles embodying a hub and a tubular rim, tubular spokes between the hub and rim and said rim having openings in the inner and outer sides thereof registering with the tubular spokes, spoke rods extending through the tubular spokes and projecting through the rim openings, a coil spring surrounding each spoke rod for normally forcing the same in an outer direction and coil springs in the tubular rim engaging opposite sides of the spoke rods, the outer end of each spoke rod having a plurality of divergent feet and a transverse water blade secured to the feet.

12. A ground engaging and water propelling wheel for land and water vehicles embodying a hub and a tubular rim, tubular spokes between the hub and rim and said rim having openings in the inner and outer sides thereof registering with the tubular spokes, spoke rods extending through the tubular spokes and projecting through the rim openings, a coil spring surrounding each spoke rod for normally forcing the same in an outward direction and coil springs in the tubular rim engaging opposite sides of the spoke rods, the mounting for the spoke rods permitting limited axial movement thereof and pivotal movement at their inner ends, the outer end of each spoke rod having a plurality of divergent feet and a transverse water blade secured to the feet.

In testimony whereof I affix my signature.

HERMAN TRZECIAK.